United States Patent [19]

Hiwatashi et al.

[11] Patent Number: 4,978,848
[45] Date of Patent: Dec. 18, 1990

[54] SUSPENSION CONTROL SYSTEM FOR A MOTOR VEHICLE

[75] Inventors: Yutaka Hiwatashi; Katsuyoshi Kamimura; Atsushi Mine, all of Tokyo, Japan

[73] Assignee: Fuji Jukogyo Kabushiki Kaisha, Tokyo, Japan

[21] Appl. No.: 334,544

[22] Filed: Apr. 7, 1989

[30] Foreign Application Priority Data

Apr. 12, 1988 [JP] Japan .............................. 63-49077[U]

[51] Int. Cl.⁵ .............................................. G01D 5/34
[52] U.S. Cl. ........................ 250/231.16; 250/231.17; 280/840
[58] Field of Search ........ 250/231 SE, 237 G, 231.16, 250/231.17; 280/840

[56] References Cited

U.S. PATENT DOCUMENTS

| 3,549,897 | 12/1970 | Blake | 250/231 SE |
| 4,105,216 | 8/1978 | Graham et al. | 280/840 |
| 4,580,046 | 4/1986 | Sasaki et al. | 250/237 G |
| 4,700,062 | 10/1987 | Ernst | 250/231 SE |
| 4,822,063 | 4/1989 | Yopp et al. | 280/840 |

Primary Examiner—David C. Nelms
Assistant Examiner—S. Allen
Attorney, Agent, or Firm—Beveridge, DeGrandi & Weilacher

[57] ABSTRACT

An apparatus for adjusting height of a vehicle includes an incremental-type rotary encoder operated as a sensor for sensing the height of the vehicle. The incremental-type rotary encoder comprises a rotary disc having two sets of slits positioned at circumferential portions having different radii each other and different phase of 90° in a rotating direction of the rotary disc. The incremental-type rotary encoder is further provided with a slit having a semi-circular shape disposed along a circumferential periphery thereof. A neutral position of an operation range of the rotary disc is determined as a boundary of the location of the semi-circular slit. The semi-circular slit is detected to discriminate whether height of the vehicle is above or below the neutral position of the rotary disc. A height adjusting mechanism is displaced in a vertical direction according to data from a detector. The apparatus controls the rotating direction and the amount of the rotation of the rotary disc.

10 Claims, 3 Drawing Sheets

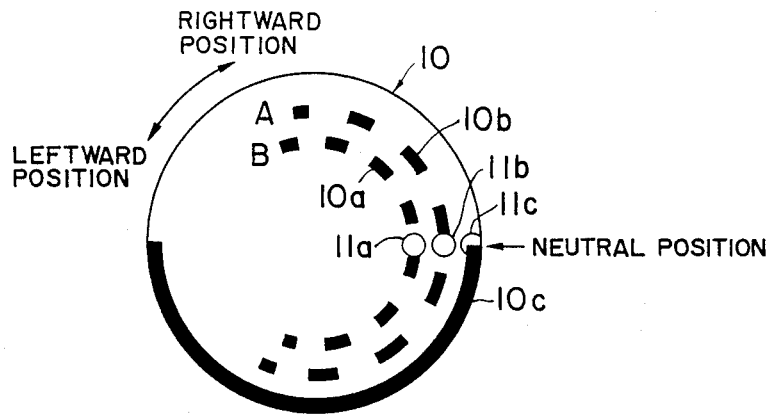
F I G. 1
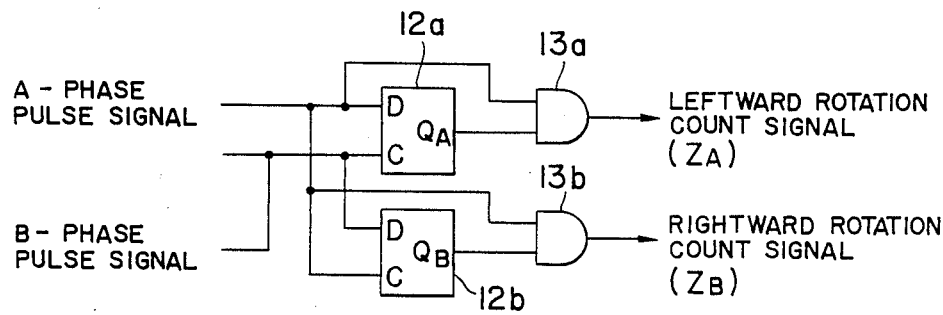
F I G. 2
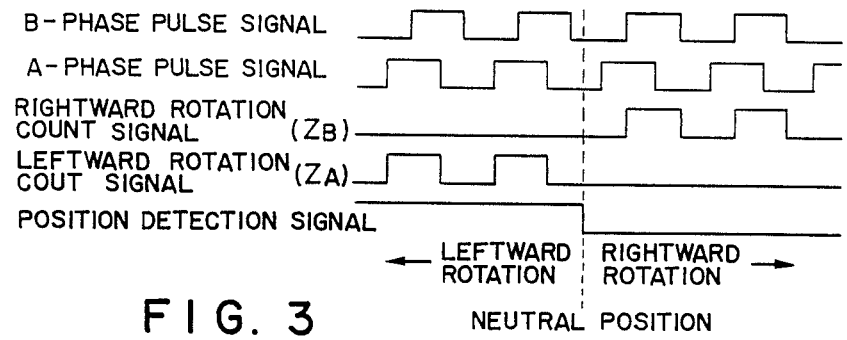
F I G. 3

SUSPENSION CONTROL SYSTEM FOR A MOTOR VEHICLE

BACKGROUND OF THE INVENTION

The present invention relates to a method and apparatus for adjusting height of a motor vehicle.

The height of a motor vehicle is generally adjusted or controlled by a vehicle height adjusting apparatus comprising a strut type suspension mechanism operatively coupled with a suspension arm swingably connected to the vehicle. The vehicle height adjusting apparatus is operated by signals from a rotary encoder for converting vertical displacement of the suspension arm into a rotational one.

The rotary encoders are sensors for servo control systems. The rotary encoders generally includes two types. One is an incremental-type rotary encoder capable of detecting a rotational direction and displacement by detecting a two-phase pulse signal and the other is an absolute-type rotary encoder capable of detecting an absolute position by detecting a binary digit signal. In the rotary encoders of these types, the incremental-type rotary encoder is generally utilized because of the simple structure thereof and a few output lines, for example, as disclosed in the Japanese Patent Laid-open (Kokai) Publication No. 61-117414.

However, the absolute-type rotary encoder is required to prepare numbers of bits corresponding to required resolving capacity. For example, in order to discriminate the number of 256, i.e. $2^8$, it is required to prepare 8 bits (8 sets of photointerrupters). The preparation of the 8 bits involves problems about the location, space and excessive cost. On the other hand, the incremental-type rotary encoder can indicate the rotating direction and the increment from the initial position, but can not discriminate the absolute position.

SUMMARY OF THE INVENTION

It is an object of the present invention to eliminate the defects encountered to the conventional technique and to provide a method and apparatus for adjusting vehicle height. The present invention includes a vehicle height sensor comprising an incremental-type rotary encoder having high resolving capacity capable of effectively detecting rotating direction and absolute position of a rotary disc of the rotary encoder so that the vehicle height is effectively adjusted according to the detected data.

This and other object can be achieved according to the present invention by providing, in one aspect, an apparatus for adjusting a vehicle height provided with a strut type suspension mechanism including a suspension arm swingably connected to the vehicle. The apparatus includes an incremental-type rotary encoder operated as a sensor for sensing height of the vehicle and operatively connected to the suspension arm. The incremental-type rotary encoder comprises a rotary disc having two sets of slits or magnetic strips positioned at circumferential portions having different radii with respect to each other and having a 90° phase difference in a rotating direction of the rotary disc. And a detector for detecting the slits or magnetic strips is disposed on the rotary disc by digits and generates two-phase pulse signals having different phase of 90°. Furthermore, the vehicle height adjusting apparatus is characterized in that the rotary disc of the incremental-type rotary encoder is further provided with a slit or magnetic strips having a semi-circular shape disposed along a circumferential periphery thereof. A neutral position of an operation range of the rotary disc is determined by a boundary of the semi-circular slit or magnetic material. Then the semi-circular slit or magnetic strip is detected by a detector for deciding whether the vehicle height is above or below the neutral position of the rotary disc. And a circuit means is operatively connected to the strut type suspension mechanism and to adjust the height of the vehicle in a vertical direction according to data from the detector as to whether a position detected by the detector is above or below the neutral position of the rotary disc. Then the circuit means starts measurement of the rotating direction and the amount of the rotation of the rotary disc from a time when the detecting means detects the neutral position of the rotary disc.

In another aspect of the present invention, there is provided a method for adjusting vehicle height provided with a strut type suspension mechanism including a suspension arm swingably connected to the vehicle for adjusting the vehicle height described above. The method is characterized in that the semi-circular slit or magnetic strip is detected for deciding whether vehicle height is above or below the neutral position of the rotary disc. The strut type suspension mechanism is displaced in a vertical direction according to data of the position. And the measurement of the rotating direction and the amount of the rotation of the rotary disc is started from a time when the detector detects the neutral position of the rotary disc.

According to the present invention, the neutral position for the rotation of the rotary disc of the incremental type rotary encoder is set as a reference position. The absolute position of the rotary disc is detected in accordance with the reference position. The control circuit means controls the rotating direction and the amount of the rotation of the rotary encoder according to the detected data. The vehicle height is adjusted responsive to the signal from the control circuit means through the incremental-type rotary encoder.

The preferred embodiment, the other objects and features of the present invention will become understood from the following description with reference to the accompanying drawings.

BRIEF DESCRIPTION OF THE DRAWINGS

FIG. 1 is a plan view of a rotary disc of an incremental-type rotary encoder of a vehicle height adjusting apparatus according to the present invention;

FIG. 2 shows a circuit for generating count signals in different rotation directions;

FIG. 3 shows a chart representing the relationship between amounts of leftward and rightward rotation;

DESCRIPTION OF THE PREFERRED EMBODIMENTS

Figure 5:
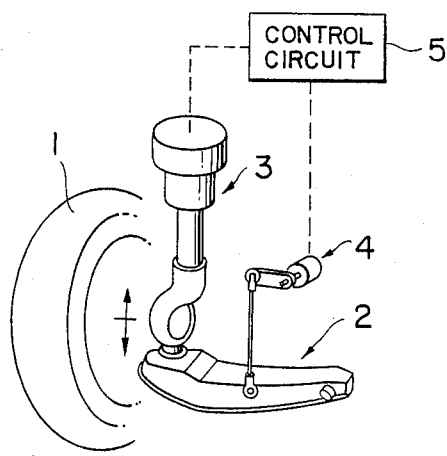
FIG. 5 is a perspective view of a vehicle height adjusting apparatus.

Referring to FIG. 5, a wheel 1 is rotatably connected to a vehicle (not shown) by a suspension arm 2 which is vertically swingable. A lower end of a strut type suspension mechanism 3 is coupled to one end portion of the suspension arm 2. The strut type suspension mechanism includes an apparatus for adjusting height of the vehicle therein. The vehicle height adjusting apparatus is controlled by a signal transmitted from a control circuit means 5. The control circuit is responsive to a signal from an incremental-type rotary encoder 4. The rotary encoder 4 detects the amount of the rotating motion from the vertical motion of the suspension arm 2.

Figure 6:
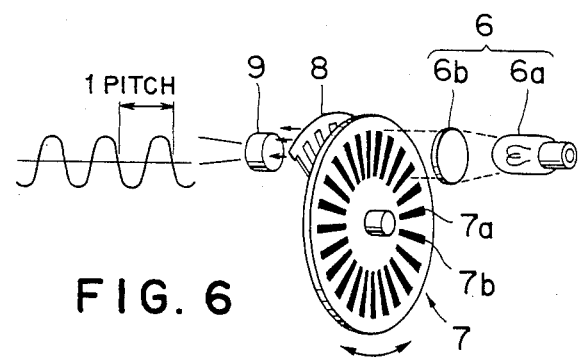
FIG. 6 is an illustration of a basic structure of an incremental-type rotary encoder.

FIG. 6 shows the details of the basic construction of an optically-detecting incremental-type rotary encoder. The incremental-type rotary encoder comprises a light source unit 6, a rotary disc 7 rotatable about a rotating shaft 7a thereof, a detection slit unit 8, and a light receiving element 9 using a photodiode as an example. The light source unit 6 comprises a lamp 6a and a collimator lens 6b for converting light beams emitted from the lamp 6a into parallel light beams. The rotary disc 7 is provided with a plurality of radial slits 7b spaced with an angular pitch for equally dividing the circumferential position of the rotary disc 7. The detection slit unit 8 is also provided with a plurality of slits of an arrangement having the same angular pitch as those of the rotary disc 7. The rotary disc 7 and the detection slit unit 8 are disposed with a small gap between the light source unit 6 and the light receiving element 9.

When the rotary disc 7 rotates one pitch of the slit 7a, the light receiving element 9 receives the light one time through the detection slit unit 8 and detects a change of lightness of the light. The detected change of lightness is then converted into an output voltage of sine wave shape, which is thereafter converted into pulses. The rotation amount of the rotating shaft 7a is digitized and measured by counting the pulse numbers by means of a counter.

Figure 7A:
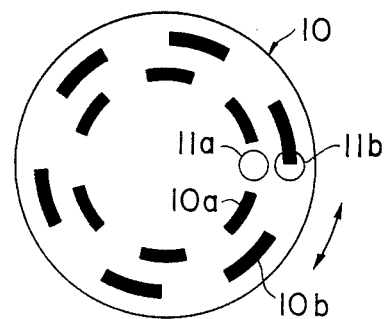
FIG. 7A shows a plan view of a rotary disc provided with two sets of two-phase slits.
Figure 7B:
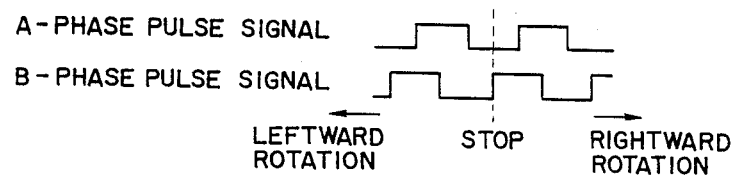
FIG. 7B is a chart showing the relationship between rotation amount of the rotary disc shown in FIG. 7A and two-phase pulse signals.

According to the incremental-type rotary encoder provided with the rotary disc having slits of single phase, it is possible to measure and detect the amount of the rotary disc rotation, whereas it is impossible to decide the direction of the rotation. In order to eliminate this defect, there is provided a rotary disc provided with two set of slits 10a and 10b of two-phase (A and B) as shown in FIG. 7A. As shown in FIG. 7A, a rotary disc 10 is provided with two sets of two-phase slits 10a and 10b positioned at circumferential positions having different radii each other on the rotary disc 10 with the different phase of 90° in the rotational direction of the rotary disc 10. An A-phase detector 11a and a B-phase detector 11b detect these two-phase slits 10a and 10b provided on the rotary disc 10, which are disposed between the light sources and the light receiving elements of the detectors 11a and 11b, respectively. The A-phase and B-phase detectors 11a and 11b generates A-phase and B-phase pulse signals respectively as shown in FIG. 7B. Accordingly, the rotating direction of the rotary disc 10 is discriminated according to a transition order of these pulse signals.

The present invention has the same vehicle height adjusting apparatus utilizing the incremental-type rotary encoder of the character described above. Namely, the incremental-type rotary encoder comprises the rotary disc described above and two set of detectors. The rotary disc is provided with two sets of two-phase slits disposed on the circumferential positions on the rotary disc having different radii each other with the different phase of 90° in the rotational direction of the rotary disc. Each of the detectors includes a light source unit and a light receiving element arranged so as to interpose the corresponding set of slits on the rotary disc therebetween. The detectors generate two-phase pulse signals with the different phase of 90° responsive to lightness of the light detected by the detectors.

According to the vehicle height adjusting apparatus, the rotary disc is further provided with a slit of semicircular shape formed along lower or upper half of an outer periphery of the rotary disc with a boundary positioned at a substantially neutral position of an operating range of the rotary disc. The apparatus includes a detector for detecting whether the height of the vehicle is within an upper range or within a lower range with respect to the neutral position by this semicircular slit. The apparatus further includes a control circuit means which operates the height adjusting apparatus according to the position of the rotary disc, with respect to the neutral position thereof, from operation starting time so as to change the vehicle height upwardly or downwardly. The control circuit means further serves to start measuring of the rotational direction and the rotational amount of the rotary disc of the incremental-type rotary encoder from the time when the detector detects that the rotary disc is positioned at the neutral position.

The characteristic features of the vehicle height adjusting apparatus will be described further in detail hereafter with reference to FIGS. 1 to 4, in which reference numerals are added to the elements or members corresponding to those shown in FIG. 7 of the prior art.

Referring to FIG. 1, the rotary disc 10 is further provided with a slit 10c formed along an outer periphery 25 of the rotary disc 10 outside the two phase slits 10a and 10b. The slit 10c is of a semi-circular shape in a clockwise direction from the neutral position of the rotary disc as a boundary. A detector 11c is located at a portion corresponding to the neutral position of the rotary disc. The detector 11c detects the slit 10c when the rotary disc 10 rotates in a counterclockwise direction, i.e. leftwardly as viewed, from the neutral position and then the detector 11c generates an output signal. However, the detector 11c does not detect the slit 10c when the rotary disc 10 rotates in a clockwise direction, i.e. rightwardly, so that the detector 11c does not generate the output signal.

When the rotary disc 10 is positioned at the neutral position as shown in FIG. 1, the slits 10a and 10b are positioned not to be detected by the A-phase and B-phase detectors 11a and 11b. The variations of the waves of the A-phase pulse signal from the A-phase detector 11a, the B-phase pulse signal from the B-phase detector 11b, and the position detection signal from the position detector 11c are represented by FIG. 3, respectively.

FIG. 2 shows a circuit for discriminating the rotational (i.e. leftward or rightward) direction of the rotary disc 10 according to the transition orders of the A-phase signal and the B-phase signal and for generating a leftwardly rotation count signal or rightwardly rotation count signal. The circuit of FIG. 2 is of a type per se known and includes flip-flop circuit elements 12a and 12b and AND elements 13a and 13b. The flip-flop circuit elements 12a and 12b generate output signals from output terminals $Q_A$ and $Q_B$ when the phase pulse signals are input through input terminals C and thereafter input through input terminals D. The AND elements 13a and 13b generate the leftward rotation count signal or the rightward rotation count signal during the transmission of the input signals into the input terminals D. The further details of the circuit of FIG. 2 are eliminated herein because the circuit is of per se known type and unnecessary.

The operation of the control circuit means 5 for applying function for discriminating the absolute position from the neutral position as the reference position of the incremental-type rotary encoder will be described hereunder referred to a flowchart shown in FIG. 4.

Figure 4:
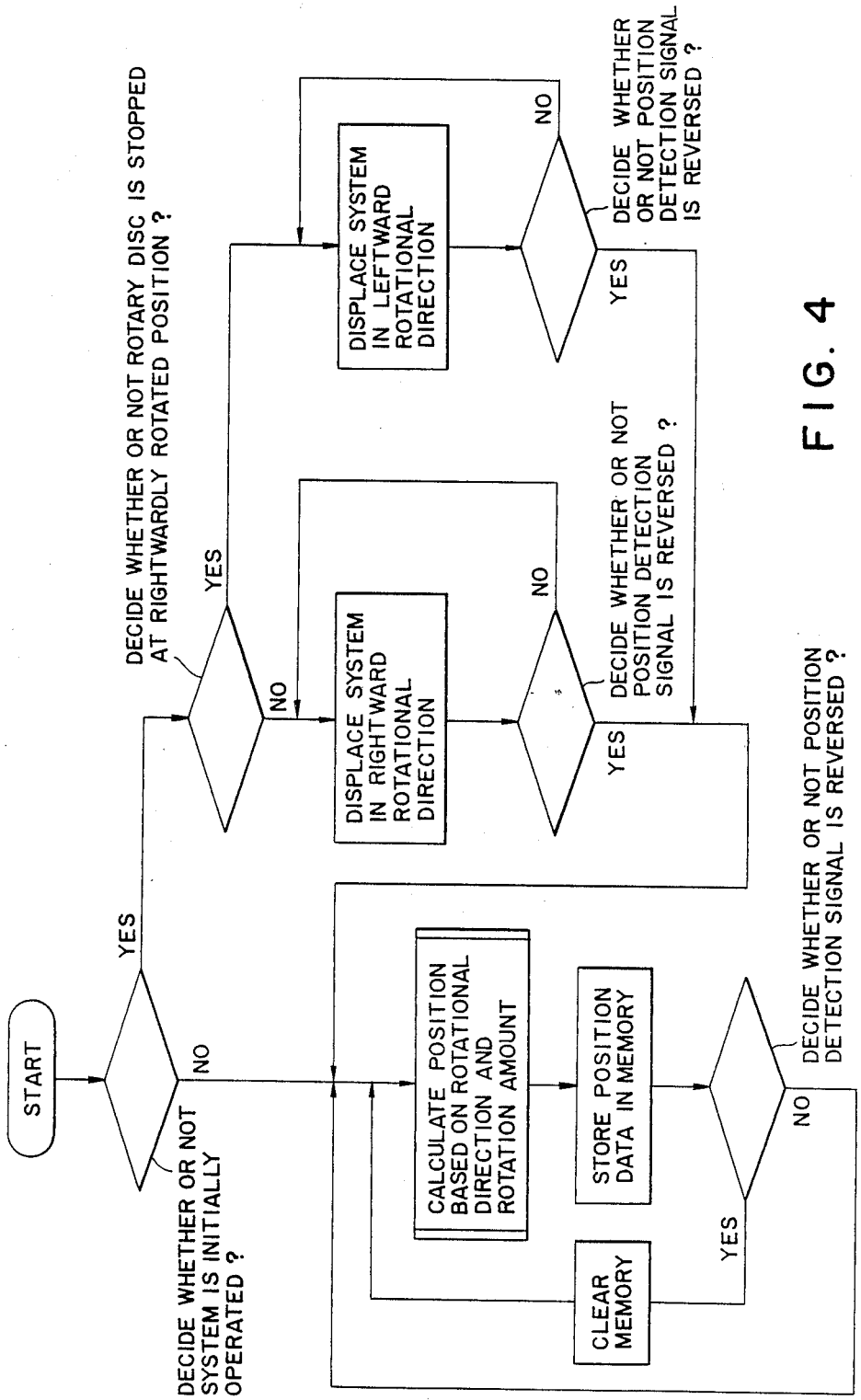
FIG. 4 is a flowchart showing the operation mode of the height adjusting apparatus.

Referring to the flowchart of FIG. 4, it is discriminated that the rotary disc is stationarily positioned at a position rightwardly rotated from the neutral position shown in FIG. 3, when the detector 11c for detecting the position of the rotary disc does not generate any position detection signal at the initial starting time of such a system as the vehicle height adjusting apparatus. The system, i.e. the vehicle height adjusting apparatus, is moved in the leftwardly rotated direction according to the former decision. Then, when the position detection signal is reversed, the position is decided as a reference position. With respect to this reference position, the absolute position of the rotary disc is decided by cumulatively adding or subtracting the leftward and rightward rotation count signals responsive to the A-phase and B-phase pulse signals from the A-phase and B-phase detectors 11a and 11b. The absolute position data is then stored in a memory. The absolute position data stored in the memory is made clear every time when the position detection signal from the detector 11c is reversed. These steps are repeated by setting the position as the reference position at each time when the position detection signal is reversed.

In the meantime, it is decided that the rotary disc is stopped at a leftwardly rotated position and not at a rightwardly rotated position when the detector 11c generates a position detection signal at the initial operation starting time, as shown in FIG. 3. According to this decision, the system, i.e. vehicle height adjusting apparatus, is moved in the rightwardly rotated direction. Then, when the position detection signal is reversed, the position is set as a reference position. The succeeding steps for operating the absolute position of the rotary disc follow the steps described hereinabove.

In the above described embodiment, the amount of the rotation of the rotary disc is detected by the presence or absence of the light passing the slits formed in the rotary disc, but it may be possible to stick belt-like magnetic materials on the rotary disc and to detect the presence or absence of the magnetic material by a magnetism detecting means such as Hall element.

According to the present invention, the absolute position from the neutral position is easily and exactly detected only by adding the simple measuring means to the conventional vehicle height adjusting apparatus. While the presently preferred embodiments of the present invention have been shown and described, it is to be understood that this disclosure is for the purpose of illustration and that various changes and modifications may be made without departing from the scope of the invention as set forth in the appendecd claims.

What is claimed is:

1. An incremental-type rotary encoder for detecting a vehicle height corresponding to a relative displacement between a body of a vehicle and a suspension mechanism, comprising:

a rotary disc operatively connected to said suspension mechanism and adapted to rotate depending on said relative displacement between said suspension mechanism and said body of the vehicle;

two sets of first designating means provided on said rotary disc for designating positions assumed by said rotary disc and each set, with respect to the other, having a different phase in a rotational direction of said rotary disc;

two sets of first detector means disposed opposite to said two sets of first designating means, respectively, for producing a signal representing said relative displacement of said rotary disc;

second designating means of semi-circular shape provided on said rotary disc for designating one of an upper and a lower range with respect to a neutral position of the vehicle height, said second designating means having an edge corresponding to said neutral position; and second detector means for producing a first signal representing that said vehicle height is within said one of the upper and lower ranges when said second detector means is disposed opposite to said second designating means, and producing a second signal representing that said vehicle height is within the other of the upper and lower ranges when said second detector means is not disposed opposite to said second designating means.

2. The encoder according to claim 1, wherein said two sets of first designating means and said second designating means are slits formed in said rotary disc, and said first and second detector means detect light passing through said slits.

3. The encoder according to claim 1, wherein said two sets of first designating means and said second designating means are magnetic strips provided on said rotary disc, and said first and second detector means detect magnetism of the magnetic strips.

4. A suspension control system for controlling a vehicle height corresponding to relative displacement between a body of a vehicle and a suspension mechanism mounted on said vehicle, comprising:

an incremental-type rotary encoder for detecting said vehicle height, said encoder including a rotary disc operatively connected to said suspension mechanism to be rotated depending on the variation of said vehicle height, two sets of first designating means provided on said rotary disc for designating positions assumed by said rotary disc, said two sets, with respect to one another, each having a different phase in a rotational direction of said rotary disc;

two sets of first detector means disposed opposite to said two sets of first designating means, respectively, for producing a signal representing said relative displacement of said rotary disc;

means for generating a first signal when said vehicle height is within an upper range with respect to a neutral position of said vehicle height, and generating a second signal when said vehicle height is within a lower range with respect to said neutral position;

deciding means responsive to said first and second signals for deciding control direction of said vehicle height at an initial state of the system, said control direction representing a direction toward said neutral position; and controlling means responsive to said control direction from said deciding means for controlling said suspension mechanism to coincide said vehicle height to said neutral position.

5. The system according to claim 4, wherein said generating means comprises:

a slit formed in said rotary disc having a semicircular shape for designating one of the upper and lower ranges with respect to said neutral position of the vehicle height, said slit having an edge corresponding to said neutral position; and a sensor for producing said first signal when said sensor is disposed opposite to said slit, and producing a second signal when said sensor is not disposed opposite to said slit.

6. The system according to claim 5, wherein said controlling means includes means for producing count signals, and means for determining an absolute position of said rotary disc, said means for determining an absolute position including means for adding count signals when said rotary disc rotates in one direction, means for subtracting count signals when said rotary disc rotates in the other direction, and means for storing in memory data representing the cumulative amount of said added and subtracted count signals, said controlling means further including means for clearing the data representing the cumulative amount of said added and subtracted count signals when the edge of said slit rotates past said sensor.

7. The system according to claim 4, wherein said generating means comprises:

a magnetic strip provided on said rotary disc with a semi-circular shape for designating one of an upper and a lower range with respect to a neutral position of the vehicle height, said magnetic strip having an edge corresponding to said neutral position; and a sensor for producing said first signal when said sensor is disposed opposite to said magnetic strip, and producing a second signal when said sensor is not disposed opposite to said magnetic strip.

8. The system according to claim 7, wherein said controlling means includes means for producing count signals and means for determining an absolute position of said rotary disc, said means for determining an absolute position including means for adding count signals when said rotary disc rotates in one direction, means for subtracting count signals when said rotary disc rotates in the other direction, and means for storing in memory data representing the cumulative amount of said added and subtracted count signals, said controlling means further including means for clearing the data representing the cumulative amount of said added and subtracted count signals when the edge of said magnetic strip rotates past said sensor.

9. A method for controlling a vehicle height corresponding to relative displacement between a body of a vehicle and a suspension mechanism mounted on said vehicle, the vehicle having an incremental-type rotary encoder for detecting said vehicle height, said encoder including a rotary disc operatively connected to said suspension mechanism to be rotated depending on the variation of said vehicle height, two sets of first designating means provided on said rotary disc for designating positions assumed by said rotary disc and said two sets being arranged, with respect to one another, at a different phase in a rotational direction of said rotary disc, two sets of first detector means disposed opposite to said two sets of first designating means, respectively, for producing a signal representing said relative displacement of said rotary disc, the rotary disc further including second designating means for designating one of an upper and a lower range with respect to a neutral position of the vehicle height, and second detector means for producing a first signal when the vehicle height is in the upper range and a second signal when the vehicle height is in the lower range, and the method comprising the steps of:

detecting with said first detection means the relative displacement of said rotary disc;

detecting with said second detection means whether said vehicle height is within an upper range or a lower range with respect to a neutral position of said vehicle height to produce a detection signal;

deciding a control direction of said vehicle height at an initial state of the system in response to said detection signal, said control direction representing a direction of rotation toward said neutral position; and controlling said suspension mechanism to coincide with vehicle height to said neutral position in response to said control direction.

10. A method as recited in claim 9 wherein said first designating means include means for outputting signals and means for adding output signals when said rotary disc rotates in a first direction and means for subtracting output signal when said rotary disc rotates in the opposite direction and means for storing in memory the cumulative amount of said output signals, said method further comprising the steps of cumulatively adding and subtracting the output signals depending upon the direction of rotation towards said neutral position, storing data in memory representing the cumulatively added and subtracted output signals, and clearing the memory when said rotary disc returns to the neutral position.

* * * * *